(12) United States Patent
Herr

(10) Patent No.: US 6,971,176 B2
(45) Date of Patent: Dec. 6, 2005

(54) METHOD FOR MOUNTING AN INSIDE COVER SECTION OF A MOTOR VEHICLE

(75) Inventor: Wolfgang Herr, Baden-Baden (DE)

(73) Assignee: Seeber AG & Co., Mannheim (DE)

( * ) Notice: Subject to any disclaimer, the term of this patent is extended or adjusted under 35 U.S.C. 154(b) by 120 days.

(21) Appl. No.: 10/753,599

(22) Filed: Jan. 9, 2004

(65) Prior Publication Data

US 2004/0143952 A1 Jul. 29, 2004

Related U.S. Application Data

(63) Continuation of application No. 10/214,134, filed on Aug. 8, 2002, now abandoned, which is a continuation of application No. 09/909,008, filed on Jul. 20, 2001, now abandoned, which is a continuation of application No. 09/264,715, filed on Mar. 9, 1999, now abandoned.

(30) Foreign Application Priority Data

Mar. 14, 1998 (DE) ................................ 298 04 637

(51) Int. Cl.$^7$ ............................................. B21D 39/03
(52) U.S. Cl. .................. 29/897.2; 29/436; 29/238; 296/136.01; 296/100.04; 296/187.02
(58) Field of Search .............................. 29/428, 897.2, 29/897.32, 436, 505, 521, 235, 238; 296/100.16, 296/100.04, 136.01, 136.12, 214, 187.02, 296/191

(56) References Cited

U.S. PATENT DOCUMENTS

| | | | | |
|---|---|---|---|---|
| 3,964,208 A | * | 6/1976 | Renner et al. ................. 49/502 |
| 4,073,535 A | * | 2/1978 | Alfter et al. ................. 296/214 |
| 4,736,509 A | * | 4/1988 | Nelson ......................... 29/451 |
| 4,996,759 A | * | 3/1991 | Nelson ........................ 277/650 |
| 5,213,391 A | * | 5/1993 | Takagi ......................... 296/205 |
| 5,244,300 A | * | 9/1993 | Perreira et al. ............. 403/381 |
| 5,992,923 A | * | 11/1999 | Wycech ................. 296/187.02 |
| 6,247,287 B1 | * | 6/2001 | Takabatake ................ 52/731.6 |

* cited by examiner

*Primary Examiner*—David P. Bryant
*Assistant Examiner*—Stephen Kenny
(74) *Attorney, Agent, or Firm*—Paul Vincent

(57) ABSTRACT

In a method for mounting an inner cover section to a support structure of a motor vehicle, an engagement member is introduced onto the cover section or onto the support structure and engages into a receptacle formed in the corresponding other component. The engagement member thereby seats loosely with play in the receptacle to engage behind it and an elastic foam is disposed in the gap defined between the cover section and the support structure to push against and thereby tension these components. The elastic foam material partially fills the intermediate space between the cover section and the support structure.

7 Claims, 1 Drawing Sheet

METHOD FOR MOUNTING AN INSIDE COVER SECTION OF A MOTOR VEHICLE

This application is a continuation of Ser. No. 10/214,134 filed Aug. 8, 2002 now abandoned which is a continuation of Ser. No. 09/909,008 filed Jul. 20, 2001 now abandoned which is a continuation of Ser. No. 09/264,715 filed Mar. 9, 1999 now abandoned and claims Paris Convention priority of German utility model application number 298 04 637.7 filed Mar. 14, 1998, the complete disclosures of which are all hereby incorporated by reference.

BACKGROUND OF THE INVENTION

The invention concerns a method for mounting an inside cover section on a support structure of a motor vehicle, wherein an engagement member is introduced onto the cover section or onto the support structure which engages into a receptacle formed in a corresponding other component.

The economical manufacture of a motor vehicle requires, among other things, that the relatively large number of inside cover sections be mounted in a simple, rapid, and reliable fashion. With conventional mounting devices, a spring clamp is introduced onto the cover member which engages into a retention eyelet disposed on the support structure and, in particular, into a sheet metal component. Deformation of the spring clamps provides compensation for dimensional tolerances occurring during manufacture as well as for various shrinkage manifestations of the components to be mounted. It has however turned out that only relatively small dimensional tolerances can be compensated for in this fashion so that there are stringent requirements concerning the dimensional precision of the inside cover sections. This is, however, disadvantageous and expensive from a manufacturing point of view.

It is therefore the underlying purpose of the invention to introduce a method for mounting an inner cover section of a motor vehicle which facilitates an economical mounting of the cover section while permitting compensation for large dimensional deviations.

SUMMARY OF THE INVENTION

This purpose is achieved with a method for mounting a cover section to a support structure inside a motor vehicle, the method comprising the steps of:
a) attaching a receptacle to one of the cover section and the support structure, said receptacle having a front wall defining an opening;
b) attaching an engagement member to another one of the cover section and the support structure;
c) moving the cover section towards the support structure to align said engagement member with said receptacle, thereby defining a gap between the cover section and the support structure;
d) disposing elastic foam, prior to or following step c), to cooperate with at least one of the cover section and the support structure;
e) pushing the cover section further towards the support structure to insert said engagement member with loose fit and with play in said receptacle within said opening and behind said front wall thereby decreasing a size of said gap and compressing said elastic foam such that said compressed elastic foam pushes between the cover section and the support structure to clamp said engagement member against said front wall, wherein said compressed elastic foam cooperates only with the cover section and the support structure.

The loose engagement between the cover section and the support structure permits acceptance of large dimensional deviations in a simple manner during assembly of the cover section. Since the engagement member engages behind the receptacle, the cover section can be introduced onto the support structure such that it cannot be pulled-off. The elastic foam is disposed between the cover section and the support structure to tension these two components in their assembled state and thereby holds them with respect to each other so that the cover section is fixed relative to the support structure. It has turned out that not only very rapid assembly times can be thereby achieved but good adjustment to dimensional deviations as well as the possibility of correction and compensation of the overall assembled position are also facilitated.

The engagement member is preferentially prefabricated separately and subsequently introduced onto the cover section or the support structure. Towards this end, same has a base section with which it e.g. is snapped into a corresponding opening. An engagement shoe is spaced from the base section by a brace and engages behind and within an opening in the receptacle. Introduction of the engagement shoe into the opening of the receptacle is simplified when the engagement shoe is tapered at its leading end and/or is directed away from the base member at this introductory end.

The receptacle can also be made from a separate prefabricated retention member which can be introduced onto the cover section or the support structure. In preferred embodiments, the engagement member is attached to the support structure and the receptacle is formed on the cover section. It is however also possible to form the engagement member on the cover member and to allow same to directly engage into an opening in the sheet metal chassis of the motor vehicle.

In a highly preferred embodiment of the invention, one single fixed bearing point is provided for between the cover section and the support structure to fix the cover section, without play, to the support structure. A plurality of loose-fitting receptacles and engagement members in accordance with the invention then cooperate with that single fixed bearing point to hold the cover on the support structure together with the elastic foam material. This embodiment advantageously provides one single fixed reference bearing cooperating with a plurality of loose-fitting receptacles and engagement members to simplify the mounting procedure.

Further details and features of the invention can be extracted from the subsequent description of an embodiment with reference to the accompanying drawings.

DESCRIPTION OF THE PREFERRED EMBODIMENT

Figure 1:
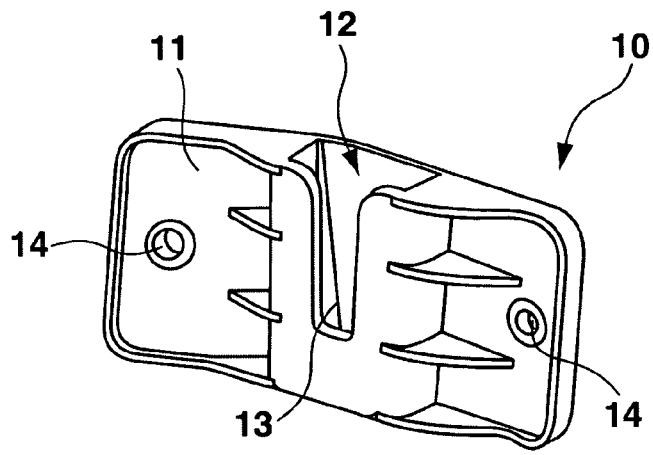
FIG. 1 shows a perspective view of a retention member.
Figure 2:
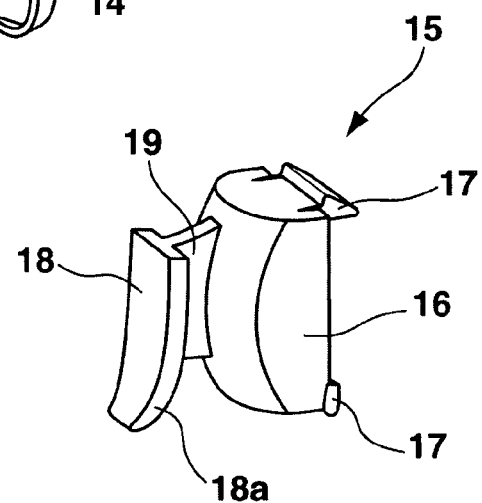
FIG. 2 shows a perspective view of an engagement member.

FIG. 1 shows a retention member 11 made from plastic forming a receptacle 10 for an engagement member 15 shown in FIG. 2. Towards this end, the retention member 11 has a vertically accessible opening 12 which has a slot 13 on its outer side extending from the upper edge vertically in a downward direction. The retention member 11 can be introduced onto an inner cover section 20 via mounting points 14 as shown in FIG. 3.

Figure 3:
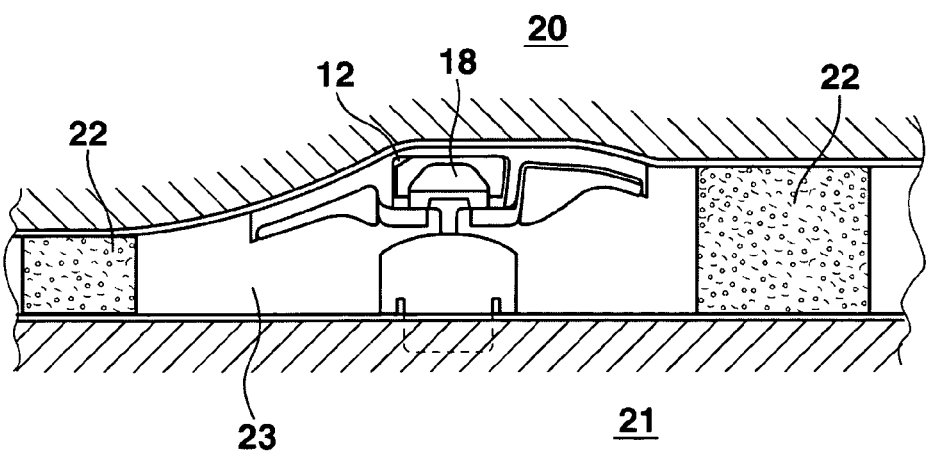
FIG. 3 shows a sectional plan view of a cover section mounted using the mounting device.

The engagement member 15 comprises a base section 16 having engagement fingers 17 formed on its back side with which the engagement member 15 can be snapped into a corresponding opening in the support structure 21, as schematically indicated in FIG. 3.

A perpendicularly protruding brace 19 is formed on the side of the base member 16 facing away from the engagement fingers 17 and supports an engagement shoe 18 on its front which extends transverse thereto. The engagement shoe 18 is tapered at its lower lead end 18a and is slightly bent away from the base member 16 at this location.

In order to mount the cover section 20 to the support structure 21, the engagement shoe 18 is introduced from an upward direction into the opening 12 of the retention member 11, wherein the brace 19 seats in the slot 13. Since the brace 19 is substantially thinner than the width of the slot 13 and since the engagement shoe 18 is thinner than the depth of the opening 12, the engagement shoe 18 engages only loosely and with substantial play in the opening 12 but however cannot be pulled-off at right angles to the insertion direction, e.g. outwardly, since the engagement shoe 18 is wider than the slot 13. Moreover, the geometry of the brace 19 and the opening 12 assure the presence of a gap 23 between the cover section 20 and the support structure 21.

In order to fix the cover section 20 relative to the support structure 21, an elastic foam material 22 is inserted into the intermediate space 23 between the cover section 20 and the support structure 21, as schematically indicated in FIG. 3, to at least partially fill that intermediate space 23.

I claim:

1. A method for mounting a cover section to a support structure inside a motor vehicle, the method comprising the steps of:
    a) attaching a receptacle to one of the cover section and the support structure, said receptacle having a front wall defining an opening;
    b) attaching an engagement member to another one of the cover section and the support structure;
    c) moving the cover section towards the support structure to align said engagement member with said receptacle, thereby defining a gap between the cover section and the support structure;
    d) disposing elastic foam, prior to or following step c), to cooperate with at least one of the cover section and the support structure;
    e) pushing the cover section further towards the support structure to insert said engagement member with loose fit and with play in said receptacle within said opening and behind said front wall thereby decreasing a size of said gap and compressing said elastic foam such that said compressed elastic foam pushes between the cover section and the support structure to clamp said engagement member against said front wall, wherein said compressed elastic foam cooperates only with the cover section and the support structure.

2. The method of claim 1, wherein said engagement member comprises a base section and an engagement shoe disposed at a separation from said base section, said engagement shoe engaging within said opening of said receptacle.

3. The method of claim 2, wherein said engagement shoe is tapered at an introductory end thereof.

4. The method of claim 2, wherein said engagement shoe is directed away from said base section at an introductory end of said engagement shoe.

5. The method of claim 1, wherein said receptacle comprises a retention member for mounting to one of the cover section and the support structure.

6. The method of claim 1, wherein said engagement member is mounted to the support structure and said receptacle is disposed on the cover section.

7. The method of claim 1, further comprising the steps of attaching the cover section to the support structure using at least one additional fixed mounting and executing steps a) through e) with a plurality of said receptacles and associated said engagement members.

* * * * *